United States Patent
Hong et al.

(10) Patent No.: US 9,965,037 B2
(45) Date of Patent: May 8, 2018

(54) HAPTIC DRIVING METHOD AND APPARATUS THEREFOR IN FLEXIBLE DISPLAY DEVICE

(71) Applicant: SAMSUNG DISPLAY CO., LTD., Yongin-si, Gyeonggi-Do (KR)

(72) Inventors: Wonki Hong, Suwon-si (KR); Seunglyong Bok, Hwaseong-si (KR); Jongseo Lee, Yongin-si (KR)

(73) Assignee: Samsung Display Co., Ltd., Yongin-si, Gyeonggi-do (KR)

( * ) Notice: Subject to any disclaimer, the term of this patent is extended or adjusted under 35 U.S.C. 154(b) by 167 days.

(21) Appl. No.: 14/956,417

(22) Filed: Dec. 2, 2015

(65) Prior Publication Data

US 2016/0313793 A1    Oct. 27, 2016

(30) Foreign Application Priority Data

Apr. 24, 2015  (KR) .................. 10-2015-0058201

(51) Int. Cl.
*G06F 3/044*    (2006.01)
*G06F 3/01*    (2006.01)
*G06F 3/041*    (2006.01)

(52) U.S. Cl.
CPC .............. *G06F 3/016* (2013.01); *G06F 3/044* (2013.01); *G06F 3/0412* (2013.01); *G06F 2203/04102* (2013.01)

(58) Field of Classification Search
CPC .................. G06F 3/044; G06F 3/0412; G06F 2203/04102; G06F 3/016
See application file for complete search history.

(56) References Cited

U.S. PATENT DOCUMENTS

| | | |
|---|---|---|
| 2009/0146533 A1 | 6/2009 | Leskinen et al. |
| 2010/0156818 A1* | 6/2010 | Burrough ................ G06F 3/016 345/173 |
| 2012/0075221 A1* | 3/2012 | Yasuda .................. B32B 37/02 345/173 |
| 2012/0256848 A1* | 10/2012 | Madabusi Srinivasan ............ G06F 1/1626 345/173 |
| 2012/0274578 A1* | 11/2012 | Snow .................... G06F 3/0488 345/173 |
| 2013/0009892 A1* | 1/2013 | Salmela .................. G06F 3/016 345/173 |
| 2013/0214914 A1 | 8/2013 | Grant et al. |
| 2013/0328447 A1* | 12/2013 | Park .................... H01L 41/0973 310/332 |
| 2014/0009449 A1 | 1/2014 | Jang |
| 2014/0160064 A1* | 6/2014 | Yairi ................... G06F 3/04895 345/174 |

(Continued)

FOREIGN PATENT DOCUMENTS

| | | |
|---|---|---|
| KR | 10-2014-0004863 A | 1/2014 |
| KR | 10-2014-0046204 A | 4/2014 |
| KR | 10-2014-0128244 A | 11/2014 |

*Primary Examiner* — Kumar Patel
*Assistant Examiner* — Amy C Onyekaba
(74) *Attorney, Agent, or Firm* — Lee & Morse, P.C.

(57) ABSTRACT

A flexible display device includes a flexible display panel, a touch panel to detect a touch input, a haptic panel to produce a tactile sensation, a haptic driver to control the haptic panel, and a curvature detector to detect a curvature of the display panel. The haptic driver controls a haptic signal corresponding to an output of the curvature detector.

19 Claims, 18 Drawing Sheets

A

B

(56) References Cited

U.S. PATENT DOCUMENTS

| | | | |
|---|---|---|---|
| 2014/0320393 A1* | 10/2014 | Modarres | G06F 3/017 345/156 |
| 2015/0169091 A1* | 6/2015 | Ho | G06F 3/044 345/173 |
| 2015/0185842 A1* | 7/2015 | Picciotto | G06F 3/016 345/173 |
| 2015/0355710 A1* | 12/2015 | Modarres | G09G 5/003 345/173 |

* cited by examiner

|   | 1 | 2 | 3 | 4 | 5 | 6 | 7 | 8 |
|---|---|---|---|---|---|---|---|---|
| 1 | H11 + | H12 ++ | H13 + | H14 · | H15 · | H16 − | H17 −− | H18 − |
| 2 | H21 + | H22 ++ | H23 + | H24 · | H25 · | H26 − | H27 −− | H28 − |
| 3 | H31 + | H32 ++ | H33 + | H34 · | H35 · | H36 − | H37 −− | H38 − |
| 4 | H41 + | H42 ++ | H43 + | H44 · | H45 · | H46 − | H47 −− | H48 − |

HAPTIC DRIVING METHOD AND APPARATUS THEREFOR IN FLEXIBLE DISPLAY DEVICE

CROSS-REFERENCE TO RELATED APPLICATION

Korean Patent Application No. 10-2015-0058201, filed on Apr. 24, 2015, and entitled, "Haptic Driving Method and Apparatus Therefor in Flexible Display Device," is incorporated by reference herein in its entirety.

BACKGROUND

1. Field

One or more embodiments described herein relate to a haptic driving method and apparatus for a flexible display device.

2. Description of the Related Art

A flexible display device is thin, lightweight, impact-resistant, bendable, and moldable. These features make flexible display devices easy to handle and suitable for use in new fields and applications. In one type of flexible display device, a touch panel is used as an intuitive interface device. In order to increase user experience, a haptic feedback device may be used for the flexible display device. A haptic feedback device receives feedback based on information relating to a touch input and generates, for example, mechanical vibration or an electrical stimulus.

SUMMARY

In accordance with one or more embodiments, a flexible display device includes a flexible display panel; a touch panel to detect a touch input; a haptic panel to produce a tactile sensation; a haptic driver to control the haptic panel; and a curvature detector to detect a curvature of the display panel, wherein the haptic driver is to control a haptic signal corresponding to an output of the curvature detector. The haptic driver may vary the haptic signal based on curvature information of the display panel and a position of the touch input. The haptic driver may increase the haptic signal as an absolute value of the curvature of the display panel increases. The haptic driver may increase the haptic signal as an absolute value of the curvature of the display panel increases and when the position of the touch input on the display panel has a positive curvature. The haptic driver may decrease the haptic signal as an absolute value of the curvature of the display panel increases and when the position of the touch input on the display panel has a negative curvature. The haptic driver may include a plurality of piezoelectric elements to generate vibration. The piezoelectric elements may be arranged in a matrix array corresponding to a screen area of the display panel. The piezoelectric elements in the array may be controlled based on a same haptic signal. The piezoelectric element array may be substantially on an entire surface of the display panel.

The flexible display device may include a transparent electrode to connect the haptic driver to the piezoelectric element array. Each piezoelectric element may detect curvature. The haptic panel may include an electrostatic haptic element to generate capacitive coupling based on an electric signal, and may include a curvature sensor.

In accordance with one or more other embodiments, a flexible display device includes a flexible display panel; a touch panel to detect a touch input; a haptic panel including at least one piezoelectric element to generate vibration; and a haptic driver to supply a haptic signal to the haptic panel, wherein the haptic panel is to detect curvature of the display panel using the at least one piezoelectric element. The haptic driver may include a curvature detector to detect curvature of the display panel, and a haptic signal supplier to apply a voltage to the at least one piezoelectric element. The haptic driver may include a memory to store curvature information of the display panel.

The haptic driver is to apply a haptic signal to the at least one piezoelectric element, and wherein the at least one piezoelectric element is adjacent to a position of a touch input detected by the touch panel. The haptic driver may vary a value of the haptic signal based on a change in curvature of the display panel. The haptic driver may vary a duration of time to apply the haptic signal based on a change in curvature of the display panel. The flexible display device may include a plurality of piezoelectric elements, wherein the haptic driver is to apply haptic signals to ones of the piezoelectric elements that are adjacent to the position of the touch input.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
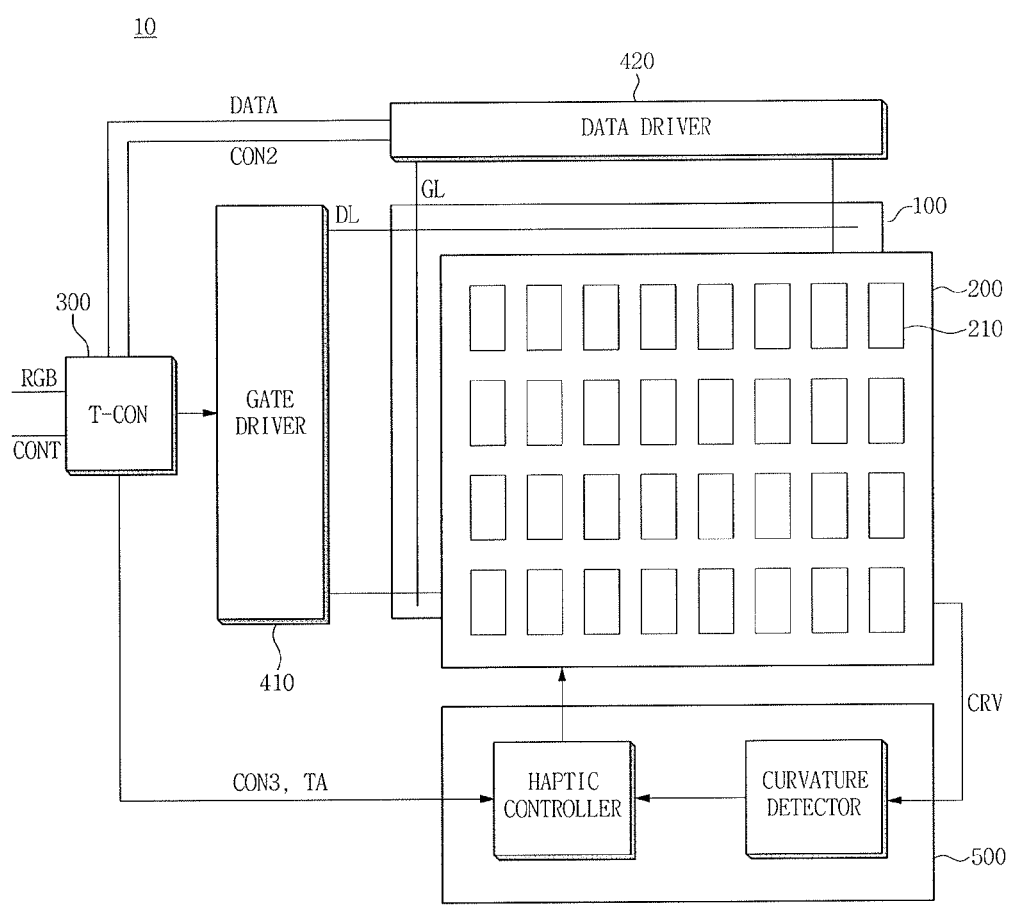
FIG. 1 illustrates an embodiment of a display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a display device 10 which includes a display panel 100, a haptic panel 200, a timing controller (T-CON) 300, a display panel driving unit 400, and a haptic driving unit 500. The display panel driving unit 400 may include a gate driver 410 and a data driver 420.

The display panel 100 a display portion for displaying images and a peripheral portion adjacent to the display portion. The display panel 100 also includes a plurality of gate lines GL, a plurality of data lines DL, and a plurality of unit pixels electrically connected to the gate lines GL and the data lines DL. The gate lines GL extend in a first direction D1 and the data lines DL extend in a second direction D2 intersecting the first direction D1. The unit pixels may be arranged in a matrix form.

The haptic panel 200 may produce a tactile sensation in response to a tactile signal. The haptic panel 200 may include a plurality of haptic elements providing a haptic effect, for example, a tactile sensation. The haptic panel 200 also includes a touch panel for detecting touch inputs. In one embodiment, only a haptic element applied with a touch input may represent a haptic effect.

The T-CON 300 receives an input image data RGB and an input control signal CONT from an external device. The input image data RGB may include a red image data, a green image data, and a blue image data. The input control signal CONT may further include a master clock signal and a data enable signal. The input control signal CONT may include a vertical synchronization signal and a horizontal synchronization signal.

The T-CON 300 may further receive a tactile signal corresponding to the input image data RGB from the external device. For example, when an alarm for an event is set off, a haptic effect may be represented on a screen along with the alarm. The T-CON 300 may generate a data signal DATA based on the input image data RGB. The T-CON 300 may output the data signal DATA to the data driver 420. The T-CON 300 may generate a third control signal CONT3 for controlling operation of the haptic driving unit 500 based on the input control signal CONT. The generated third control signal CONT3 may be output to the haptic driving unit 500.

The gate driver 410 generates gate signals for driving the gate lines GL in response to input of a first control signal CONT1 from the T-CON 300. The gate driver 410 may sequentially output the gate signals to the gate lines GL. The gate driver 410 may be mounted directly on the display panel 100, or may be connected to the display panel 100 in a tape-carrier-package (TCP) manner. The gate driver 410 may be integrated in the peripheral portion of the display panel 100.

The data driver 420 receives an input of a second control signal CONT2 and the data signal DATA from the T-CON 300, and outputs a data signal voltage to the data line DL. The data driver 420 may be mounted directly on the display panel 100, or may be connected to the display panel 100 in a tape-carrier-package (TCP) manner. The data driver 420 may be integrated in the peripheral portion of the display panel 100.

The haptic driving unit 500 may be connected to the haptic panel 200 to drive a haptic signal to a haptic element 210. The haptic driving unit 500 may receive the third control signal CONT3 and a tactile signal TA from the T-CON 300. The haptic driving unit 500 may receive curvature information CRV from the haptic panel 200. The haptic driving unit 500 may generate a haptic signal based on the third control signal CONT3, the tactile signal TA, and the curvature information CRV. The haptic driving unit 500 may output the haptic signal to the haptic panel 200.

Figure 2:
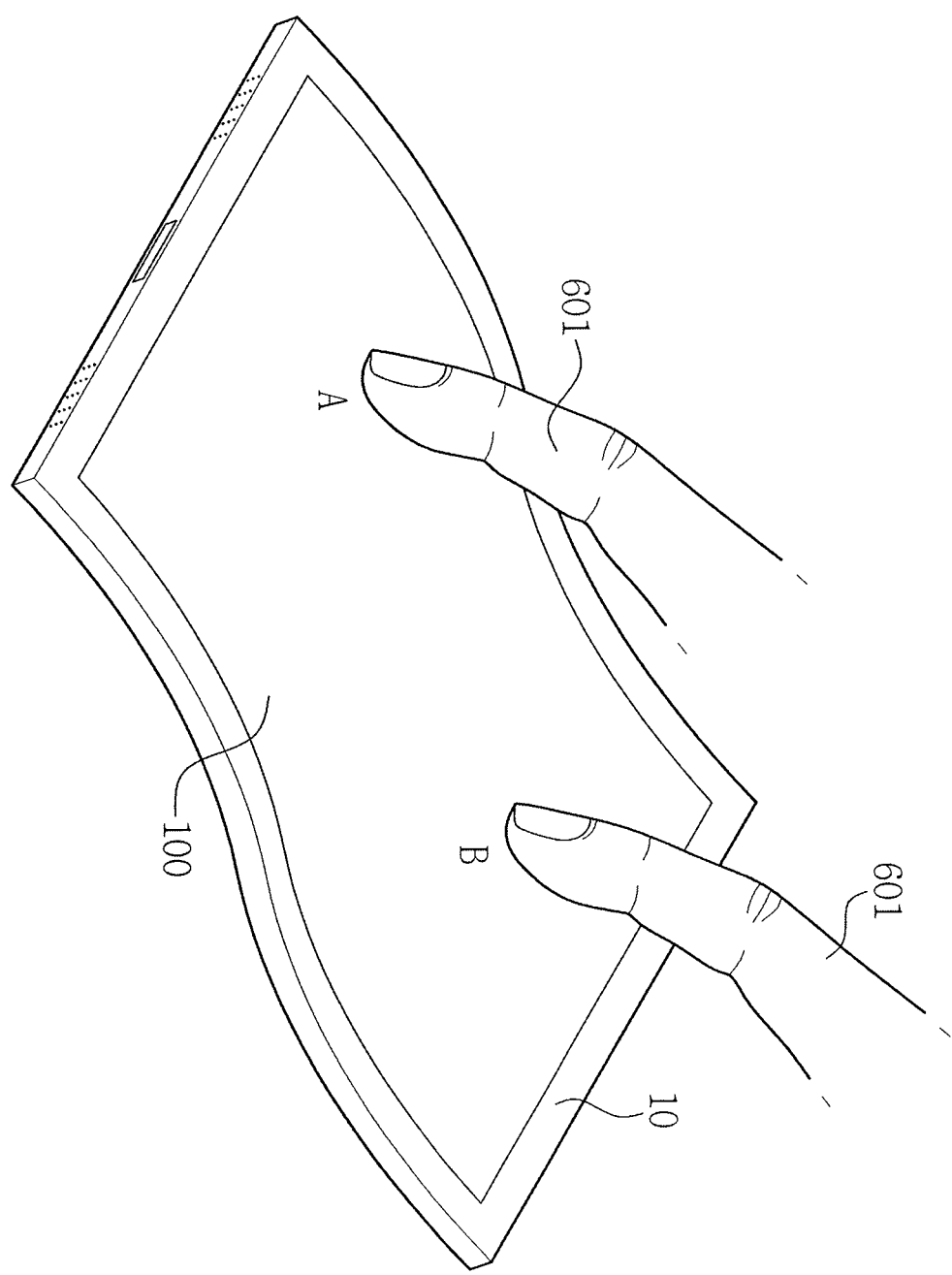
FIG. 2 illustrates an embodiment of a flexible display device.

FIG. 2 illustrates an external appearance of the display device 10 as shown in FIG. 1. The display device may be any one of a variety of electronic devices, e.g., a smart phone, a laptop computer, a tablet computer, and an electronic book. For example, when the display device 10 is a smart phone, the smart phone may output a haptic effect at a position of a touch input on a screen area in response to a touch input applied thereto. Additionally, or alternatively, the display device 10 may output a haptic effect as a system alarm. The alarm may be, for example, a low battery alarm, an insufficient memory alarm, and alarm for transmission/reception of a message or e-mail, or an event alarm set off during operation of a program.

As illustrated in FIG. 2, the display device 10 includes a flexible display panel 100 that may be bent to be convex toward a screen to have a positive curvature at position A, or may be bent to be concave toward the screen to have a negative curvature at position B. A user may select an object. For example, a keyboard, an icon, or a game character, displayed on the screen of the display panel 100. Feedback may be provided in the form of a haptic effect in response to perception of a touch operation. For example, when typing a character using a keyboard displayed on the display panel 100, a haptic element may be driven using the same haptic signal for touching a portion of the keyboard displayed at position A of the display panel 100 having a positive curvature and in a case of touching a portion of the keyboard displayed at position B of the display panel 100 having a negative curvature. Propagation of the haptic effect may occur in proportion to the size of an area being touched.

In one embodiment, position A and position B of the flexible display panel 100 may be deformed to have different curvatures from one another. The size of an area touched by a finger of the user may differ at position A and position B due to the curvature of the display panel 100. A touched area at position A may be smaller than a touched area at position B. In other words, the user may perceive different haptic effects, for example, a vibration, based on the position of the touch input being applied on the display panel 100.

Figure 3A:
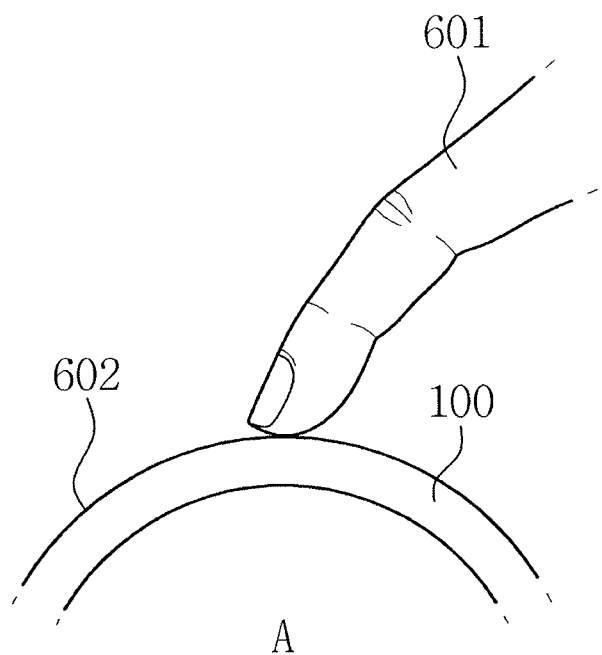
FIGS. 3A and 3B illustrate examples of haptic effects based on curvature.
Figure 3B:
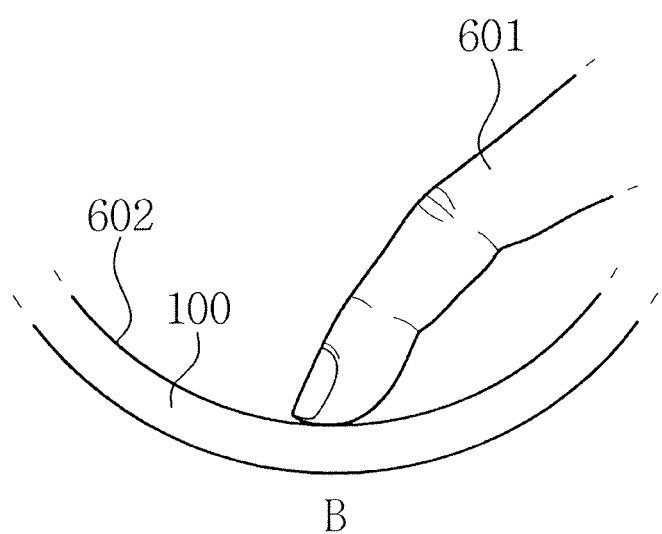

FIGS. 3A and 3B illustrate examples of haptic effects based on a curvature of the display device 10. A description pertaining to a haptic effect when position A of the display panel 100 is touched will be provided with reference to FIG. 3A. The display panel 100 may have a positive curvature at position A. When a user touches position A, a finger 601 of the user may contact a smaller portion of a touch surface 602 at position A than a portion of the touch surface 602 contacted when the finger 601 touches a planar surface. In this case, a haptic effect may not be readily perceived at position A by the user.

On the other hand, as illustrated in FIG. 3B, when the user touches position B having a negative curvature, the finger 601 may contact a greater portion of the touch surface 602 than the portion of the touch surface 602 contacted at position A. In this case, the user may perceive a stronger haptic effect at position B due to the greater touched area. Thus, the user may perceive a stronger haptic effect at a position of a touch screen having a negative curvature than on a planar portion of the touch screen. Accordingly, the flexible display panel 100 may not provide a predetermined haptic feedback to the user based on the curvature of the display panel 100.

Figure 4:
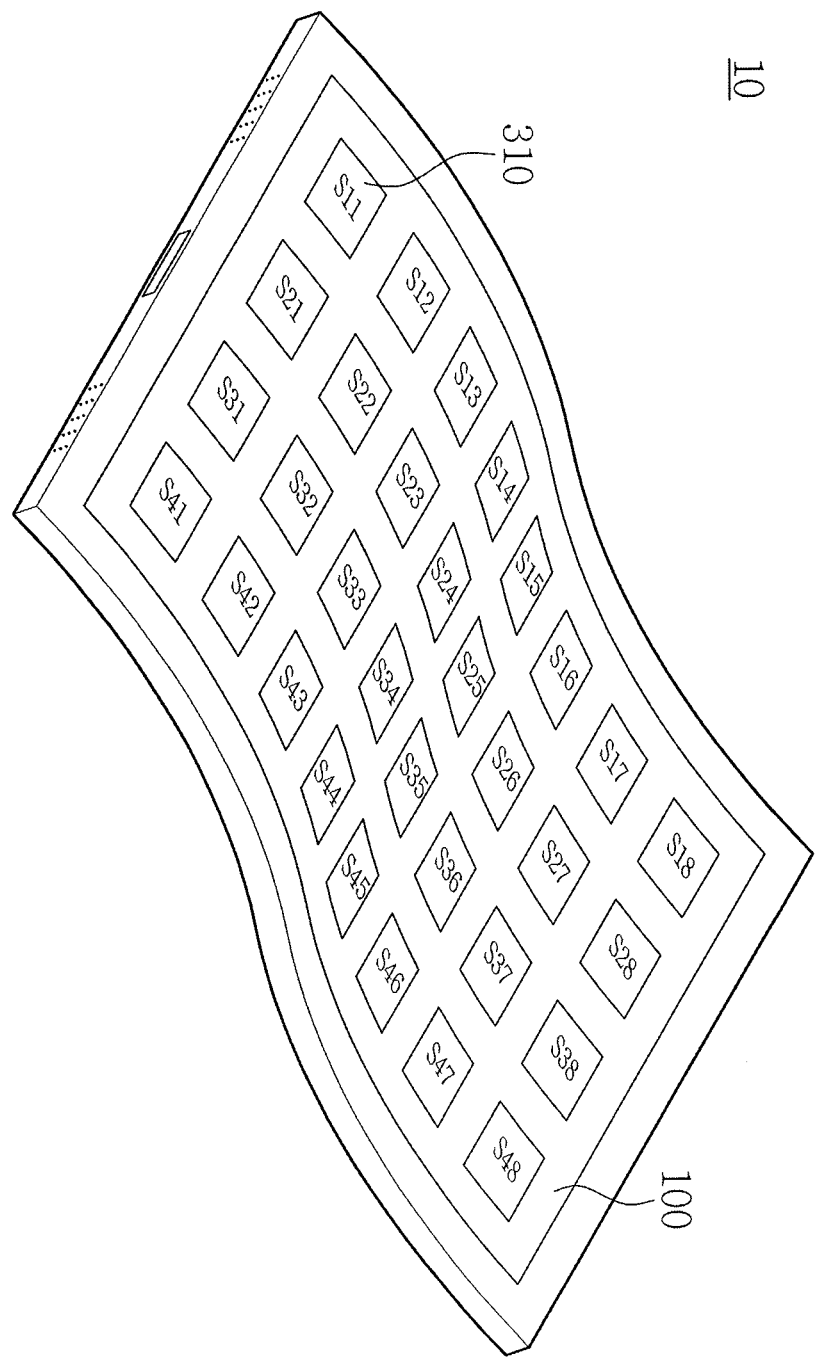
FIG. 4 illustrates an embodiment of aa curvature detection sensor.

FIG. 4 illustrates an embodiment of a curvature detection sensor for the display device 10. Referring to FIG. 4, the flexible display panel 100 includes a plurality of curvature detection sensors 310 provided in a matrix array. In this example, 32 curvature detection sensors 310 are included. A different number of curvature detection sensors 310 may be used in another embodiment, for example, based on the size and material of the display panel 100.

Each curvature detection sensor 310 may include a piezoelectric element. The piezoelectric element may include a piezoelectric material, and an upper electrode UE and a lower electrode LE connected to upper and lower portions of the piezoelectric material, respectively. The piezoelectric element may operate based on a piezoelectric effect in which an electromotive force is generated due to dielectric polarization within the piezoelectric material when a mechanical deformation occurs in the piezoelectric material. The piezoelectric element, thus, may be used as a sensor for detecting mechanical deformation. An example of the sensor function of the piezoelectric element will be provided with reference to FIGS. 6 and 7. The piezoelectric element used in the curvature detection sensor 310 may also perform the function of the haptic element 210, which generates vibration when electricity is applied.

Figure 5:
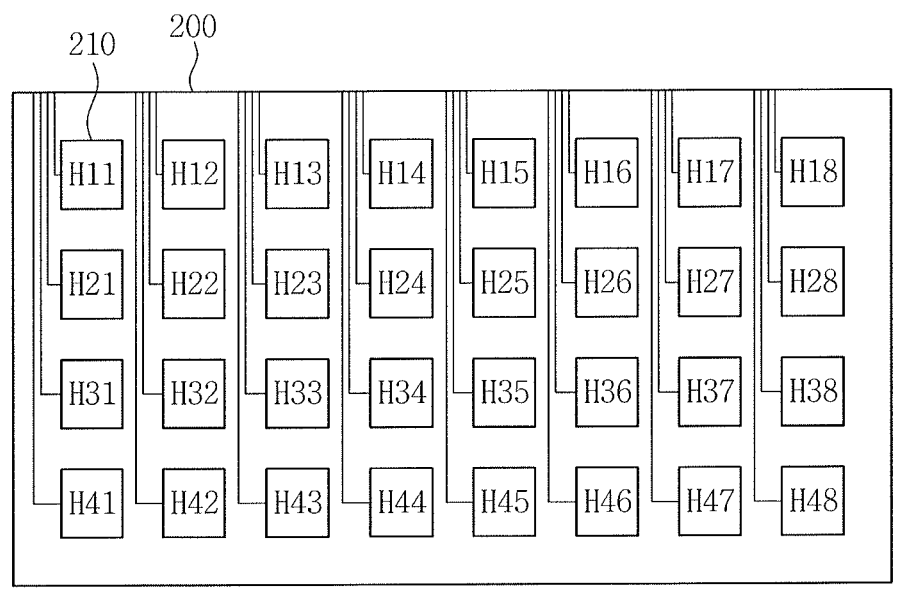
FIG. 5 illustrates an embodiment of a haptic panel.

FIG. 5 illustrates an example of the haptic panel 200. In this example, a flexible substrate (e.g., formed of plastic or a polymer) may have a low Young's modulus and a high vibration absorption rate compared to those of a glass substrate, thereby representing relatively low vibration transmission efficiency. Accordingly, haptic vibration generated in a non-display area of the display panel 10 may be diminished, while being transmitted to a display area of the display panel 100.

The haptic panel 200 outputs a haptic effect on a touch surface of the display panel 100. The haptic element 210 may output various haptic effects including mimicking a texture, generating a vibration, or adjusting a friction coefficient perceived on the touch surface. The haptic panel 200 may overlap the display area and may include a plurality of haptic elements 210 provided in an array. Although the haptic panel 200 according to this exemplary embodiment is illustrated as including 32 haptic elements 210, a different number of haptic elements 210 may be used in another embodiment, for example, based on the size of the display panel 100, a material of the substrate, or the like.

The haptic element 210 may include a piezoelectric element which vibrates, for example, at 20 kilohertz (kHz) to thereby generate vibration on the surface of the display panel 100. The piezoelectric element may also function as a curvature detection element that outputs an electric signal in response to a pressure being applied thereto.

The haptic panel 200 may include various haptic devices using an electrostatic attraction scheme, a rotational vibration generation scheme, a fluid deformation scheme, or another scheme.

Figure 6:
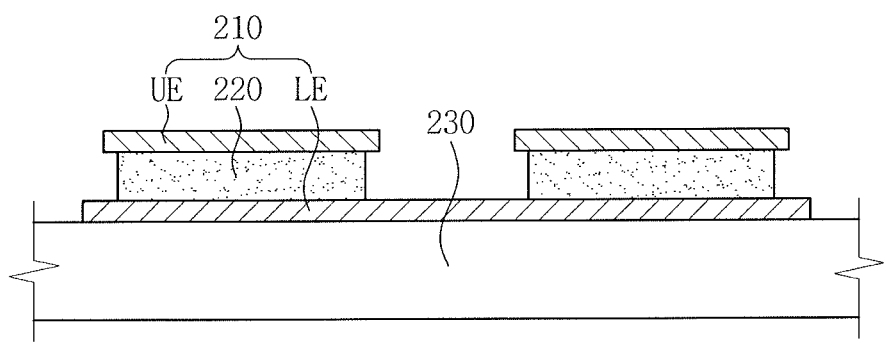
FIG. 6 illustrates an embodiment of a haptic panel with a piezoelectric element.

FIG. 6 is a cross-sectional view of an embodiment of the haptic panel 200 having a piezoelectric element. The haptic panel 200 includes the array of the haptic elements 210 formed on a haptic substrate 230. Each haptic element 210 may have a form in which the lower electrode LE, a piezoelectric layer 220, and the upper electrode UE are sequentially stacked. The lower electrode LE may include a common electrode connected to adjacent piezoelectric layers 220 simultaneously and may receive a ground voltage or a direct current (DC) bias voltage applied thereto. Examples of a material used for the piezoelectric layer 220 include piezoelectric ceramic such as lead zirconate titanate (PZT), polyvinylidene fluoride (PVDF), or an electroactive polymer.

Figure 7A:
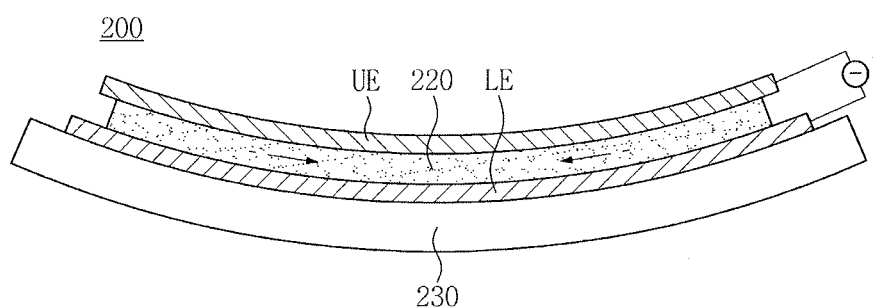
FIGS. 7A and 7B illustrate an example of a piezoelectric effect based on the curvature of a haptic panel.
Figure 7B:
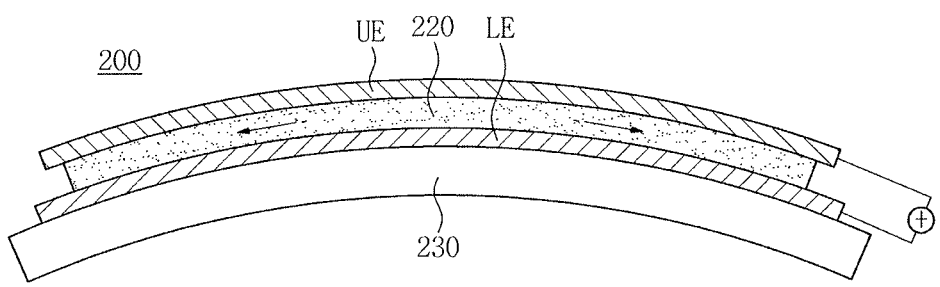

FIGS. 7A and 7B illustrates examples of a piezoelectric effect based on curvature of the haptic panel 200. In these examples, a voltage is generated as piezoelectric layer 220 is compressed or elongated as a result of bending the haptic panel 200.

FIG. 7A illustrates a haptic substrate 230 curved to be concave toward a haptic element 210. When the haptic substrate 230 is bent to have a concave upper surface (in other words, a negative curvature), the piezoelectric layer 220 receives a compressive force. When the piezoelectric layer 220 receives a compressive force in a transverse direction, a voltage output between the upper electrode UE and the lower electrode LE may have a negative polarity. As the curvature of the haptic substrate 230 increases, a greater compressive force is applied to the piezoelectric layer 220 and the piezoelectric layer 220 outputs a voltage having a higher level.

FIG. 7B illustrates the haptic substrate 230 curved to be convex toward a haptic element 210. When the haptic substrate 230 is bent to have a convex upper surface (in other words, a positive curvature), the piezoelectric layer 220 receives tensile stress in a transverse direction along a surface of the haptic substrate 230. In this case, the piezoelectric layer 220 outputs a voltage having a positive polarity. In another embodiment, the output voltage of the piezoelectric layer 220 may have different polarities and/or levels as previously described, for example, based on the material or configuration of the piezoelectric layer 220.

Figures 8, 9:
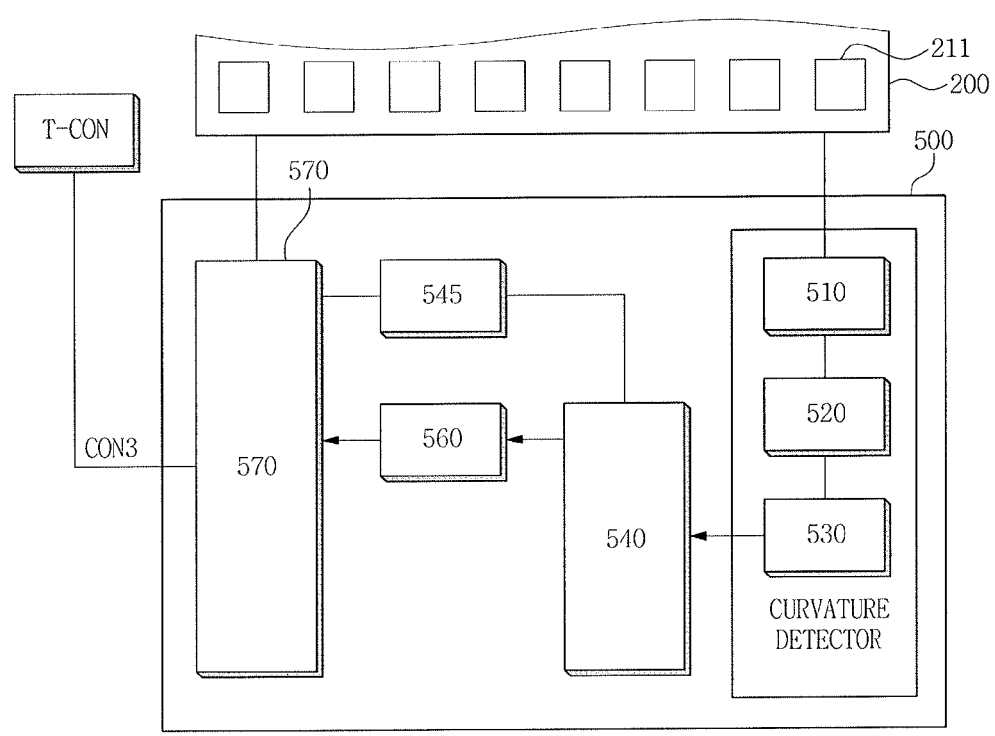
FIG. 8 illustrates an example of a curvature signal output of a haptic element.
FIG. 9 illustrates an embodiment of a haptic driving unit.

FIG. 8 illustrates an example of curvature signals output of haptic elements 210 based on curvature. Referring to FIG. 8, the polarity and the level of a curvature signal voltage based on the position and curvature of haptic elements in the matrix array are exemplified. The display device 10 may be deformed to have a positive curvature in a left portion thereof and a negative curvature in a right portion thereof. As illustrated in FIG. 7A, a haptic element in the right portion of the display device 10 may receive a compressive force from both sides of the piezoelectric layer 220. As illustrated in FIG. 7B, a haptic element in the left portion of the display device 10 may receive a tensile stress as the piezoelectric layer 220 is elongated.

In FIG. 8, symbols (+) and (−) denote curvature direction and the number of symbols indicate the degree of curvature. As illustrated in FIG. 8, a second column in the haptic element array of the display device 10 may have a greatest positive curvature, and a seventh column in the haptic element array may have a greatest negative curvature.

FIG. 9 illustrates an embodiment of a haptic driving unit 500 of the haptic panel 200. Referring to FIG. 9, the haptic panel 200 may use a curvature piezoelectric element 211 performing the function of a curvature detection element and a haptic element.

A sensing part 510 detects a curvature signal of the curvature piezoelectric element 211 during a sensing period. When a curvature is formed in the haptic panel 200, the curvature piezoelectric element 211 outputs a curvature signal having varying polarity and level based on the direction and degree of the curvature. The curvature signal may correspond to a voltage difference between an upper electrode UE and a lower electrode LE of the curvature piezoelectric element 211. In one embodiment, the sensing part 510 may detect a curvature signal from a plurality of curvature piezoelectric elements 211 simultaneously.

A serialization part 520 may be a device which serializes parallel curvature signals output from the curvature piezoelectric element 211. In order to convert 32 channel inputs to a single channel, a 5-bit control signal may be required. A plurality of curvature signals may be sequentially transmitted to a digital converter 530, one at a time, based on the control signal. Although the serialization part 520 is illustrated as being positioned at a rear end of the sensing part 510 in the present exemplary embodiment, the serialization part 520 may be positioned at a front end or another position of the sensing part 510 in another embodiment.

The digital converter 530 converts an analog curvature signal from the curvature piezoelectric element 211 to a digital signal. The digital curvature signal output from the digital converter 530 may be transmitted to a signal processor 540.

The signal processor 540 determines the deformed state of the haptic panel 200 based on the digital curvature signal. The signal processor 540 may perform profiling on the deformed state of a display panel 100. The signal processor 540 may store a curvature profile information in a memory 550. The signal processor 540 may compare an input of a curvature profile information and the stored curvature profile information and may analyze the comparison results. For example, when a curvature is maintained for a long period of time, the signal processor 540 may generate a warning to the user (e.g., through a vibration or alarm) in order to prevent damage to the display panel 100.

The signal processor 540 receives touched position information from a touch panel and calculates curvature information at the corresponding touched position. For example, when a position at a display device 10 is touched, the signal processor 540 transmits touched position information and curvature information to a control system 560. The control system 560 designates the curvature piezoelectric element 211 and output a haptic signal application control signal to be applied to the designated piezoelectric element 211. The haptic signal application control signal may be transmitted to an output signal supplier 570.

The output signal supplier 570 applies the haptic signal to signal wiring connected to the designated curvature piezoelectric element 211 based on the input of the haptic signal application control signal. When the touched position on the display device 10 has a positive or negative curvature, the haptic signal applied to curvature piezoelectric element 211 may have a higher or lower level of a voltage than a level of a voltage of a reference haptic signal, that is, a haptic signal in a planar state. The flexible display panel 100 may provide a predetermined haptic feedback by varying a haptic signal corresponding to a curvature of the display panel 100.

Figure 10:
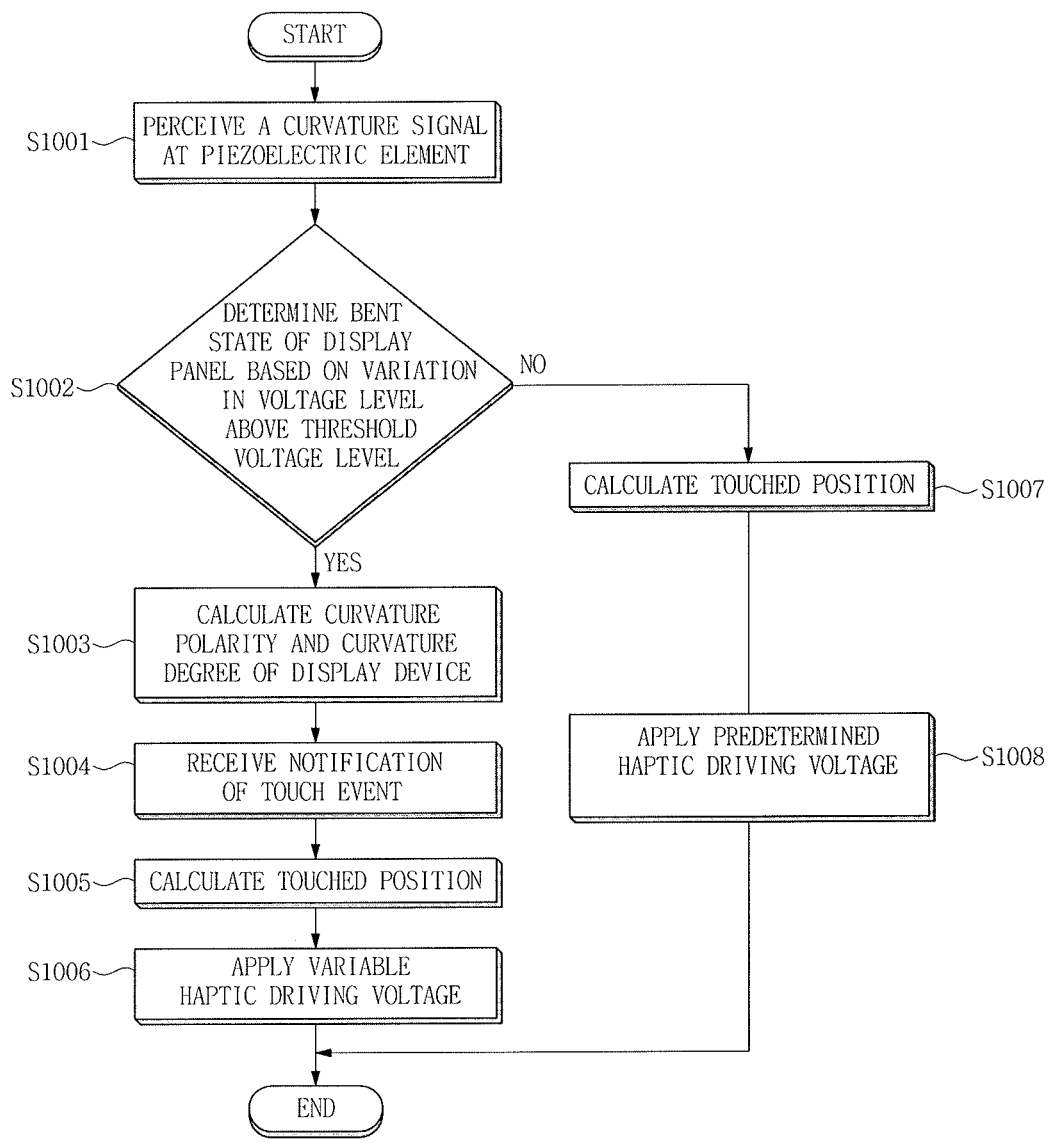
FIG. 10 illustrates an embodiment of a haptic driving method.

FIG. 10 illustrates an embodiment of a haptic driving method for generating a haptic signal output of the haptic driving unit 500. In this method, a haptic signal varies when a touch input is applied to a touch panel and when a bending force is applied to a haptic panel. In operation S1001, the sensing part 510 receives a curvature signal from the curvature piezoelectric element 211 of the haptic panel 200.

In operation S1002, the signal processor 540 compares a voltage of the detected curvature signal and a threshold voltage. The threshold voltage may be a reference voltage which determines whether the curvature signal of the curvature piezoelectric element 211 corresponds to a pressure caused by bending the display panel 100. When a level of the voltage of the curvature signal exceeds a level of the threshold voltage, the signal processor 540 may determine that the display panel 100 is bent.

In operation S1003, when the display panel 100 is determined to be bent, the signal processor 540 calculates a curvature polarity (e.g., a bending direction) and a curvature degree of the overall display panel 100.

In operation S1004, the signal processor 540 receives notification of occurrence of a touch event.

In operation S1005, the signal processor 540 determines coordinates of the touched position on the touch panel and curvature of the display panel 100 based on the touched position.

In operation S1006, the control system 560 designates a haptic element which operates corresponding to the touched position and the curvature of the display panel 100 and sets a haptic signal. The output signal supplier 570 applies a corresponding signal to the curvature piezoelectric element 211.

When the level of the voltage of the input curvature signal does not exceed the level of the threshold voltage in operation S1002, the signal processor 540 receives the touched position output from the touch panel, designates a haptic element at the corresponding touched position, and sets a reference haptic signal in operation S1007.

In operation S1008, the output signal supplier 570 applies the reference haptic signal to the designated haptic element.

Figure 11:
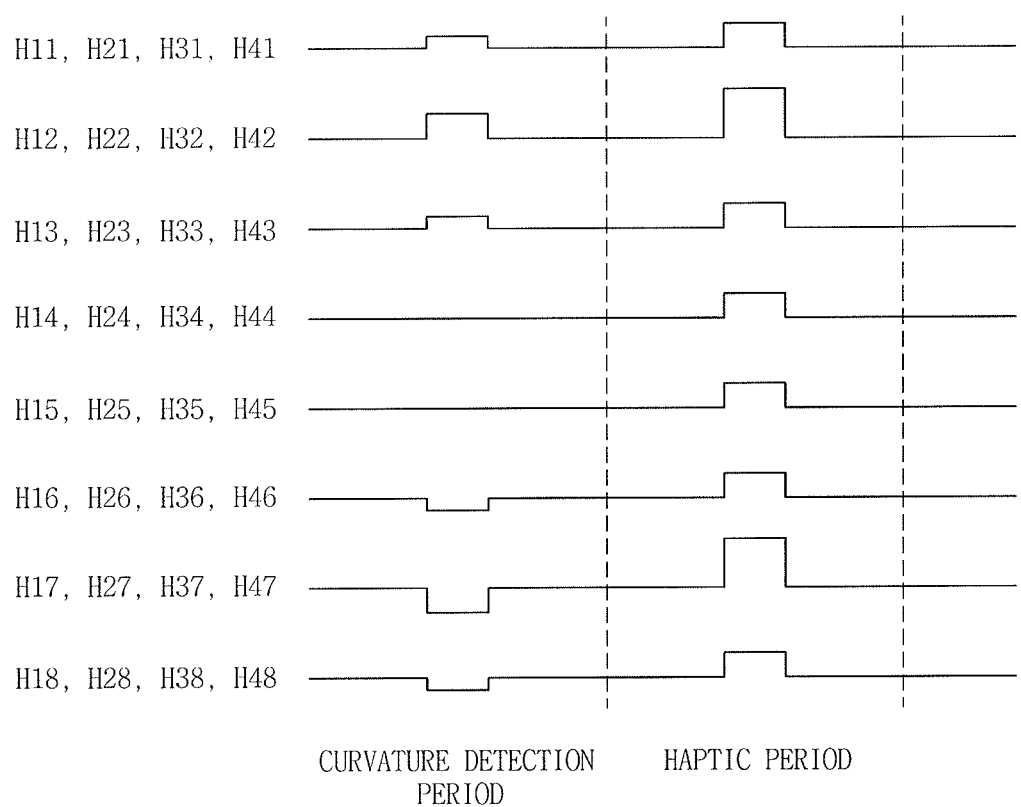
FIG. 11 illustrates an example of a haptic signal waveform.

FIG. 11 illustrates an example of a haptic signal waveform, and more specifically a waveform of a corrected haptic signal applied to an array of curvature piezoelectric elements. In accordance with FIG. 11, the haptic driving unit 500 detects 32 curvature signals from piezoelectric elements H11 through H48 arranged in the structure of FIG. 5 during a curvature detection period.

The curvature piezoelectric element H11 outputs a curvature signal having a first voltage with positive polarity. The curvature piezoelectric element H12 outputs a curvature signal having a second voltage with positive polarity. A level of the second voltage is higher than a level of the first voltage. The curvature piezoelectric element H13 outputs a curvature signal having the first voltage. The curvature signals of the curvature piezoelectric elements H11, H12 and H13 may represent that the display panel 100 is deformed to have a positive curvature.

The curvature piezoelectric element H16 outputs a curvature signal having a third voltage with a negative polarity. The curvature piezoelectric element H17 outputs a curvature signal having a fourth voltage with a negative polarity. A level of the fourth voltage is lower than a level of the third voltage. The curvature piezoelectric element H18 outputs a curvature signal having the third voltage. The curvature signals of the curvature piezoelectric elements H16, H17 and H18 may represent that the display panel 100 is deformed to have a negative curvature.

The deformed state of the display panel 100 may be determined by analyzing the curvature signals of the array of the curvature piezoelectric elements. FIG. 11 illustrates the example of a waveform of the display panel 100 which does not have a curvature variation in the row direction. In another embodiment, the display panel 100 may have a deformed state which includes curvatures in both row and column directions.

The haptic driving unit 500 applies a haptic signal to the designated curvature piezoelectric element 211, corresponding to the detected curvature information and the touched position information of the display panel 100, during a haptic period subsequent to the curvature detection period. For example, when a position of the curvature piezoelectric element H12 having a positive curvature is touched, the haptic driving unit 500 may apply, to the curvature piezoelectric element H12, a haptic signal that is corrected to have a higher level of voltage than the reference voltage, e.g., a voltage of a haptic signal applied in a planar state.

On the other hand, when a position of the curvature piezoelectric element H17 having a negative curvature is touched, the haptic driving unit 500 may apply, to the curvature piezoelectric element H17, a haptic signal that is corrected to have a lower level of a voltage than the reference voltage.

In the case of a touch panel using a multi-touch scheme, in which the touch panel detects a plurality of touched positions simultaneously, the haptic driving unit 500 may apply different haptic signals to the haptic elements 210 simultaneously. In order to reduce the amount of power consumed, the haptic driving unit 500 may not apply a haptic signal to an untouched curvature piezoelectric element.

Figure 12A:
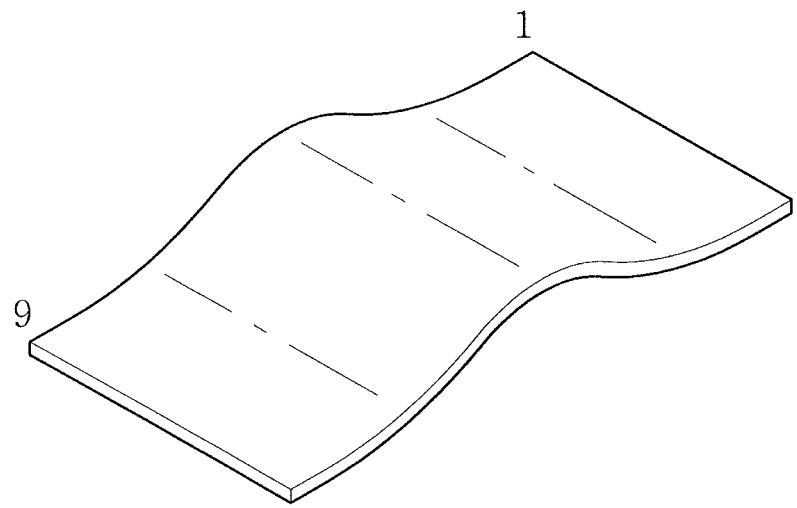
FIGS. 12A and 12B illustrate an example of a corrected haptic signal.
Figure 12B:
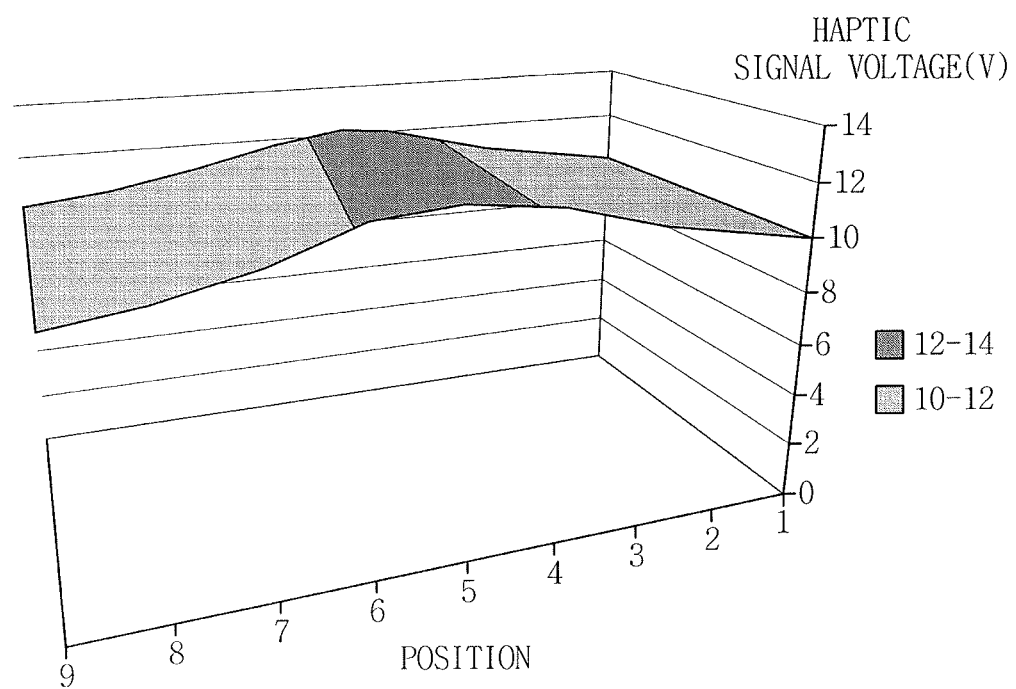

FIGS. 12A and 12B illustrates an example of a profile of a 2D curvature of a display panel and a corresponding corrected haptic signal. The corrected haptic signal includes an increase and/or decrease in the level of a haptic driving voltage corresponding to the profile of the two-dimensional (2D) curvature of the display panel. In FIG. 12A, the display device is deformed to have a mildly convex central portion of the display panel. In FIG. 12B, a corrected haptic signal for each position is illustrated relative to a reference haptic signal having a voltage level of 10V. The level of the voltage at the central portion of the display panel having a positive curvature increases by 2V at maximum from the voltage level of the reference haptic signal. Thus, the voltage levels lie in a range of about 10V to about 12V.

Figure 13A:
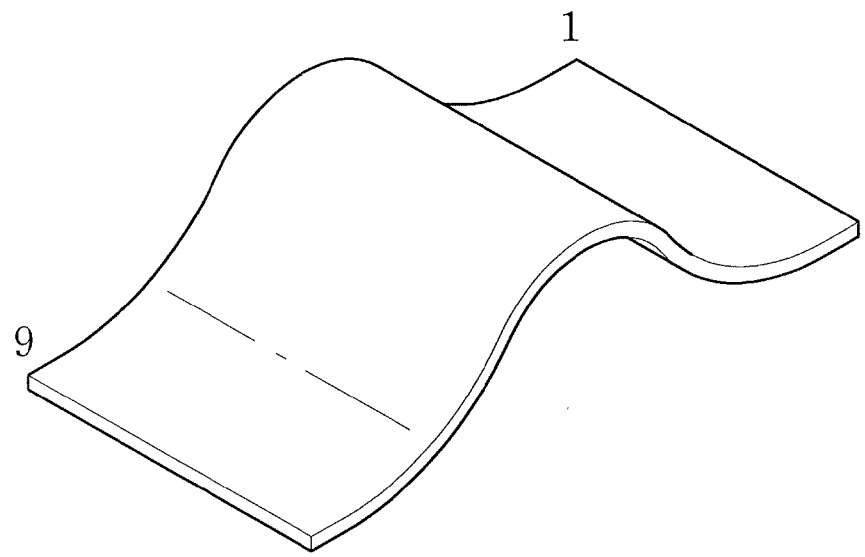
FIGS. 13A and 13B illustrate another example of a corrected haptic signal.
Figure 13B:
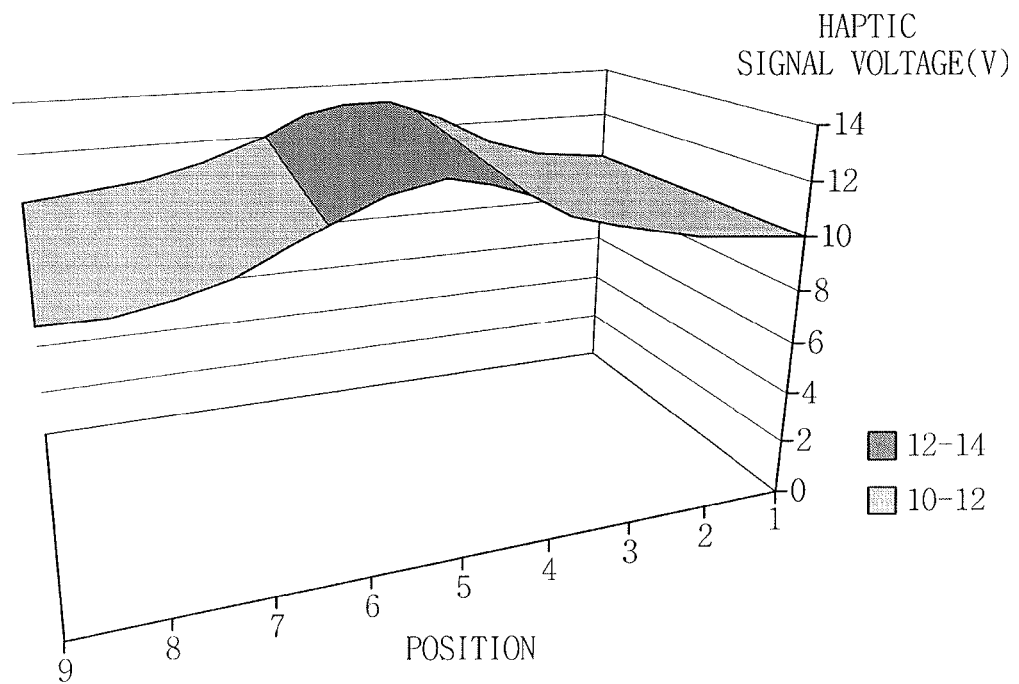

FIGS. 13A and 13B illustrate an example of a profile of a 2D curvature of another display panel and a corresponding corrected haptic signal. In FIG. 13A, the display device is deformed so that a central portion has a positive curvature. In FIG. 13B, a corrected haptic signal has a voltage level in the range of about 10V to about 13V at the central portion of the display device.

Figure 14A:
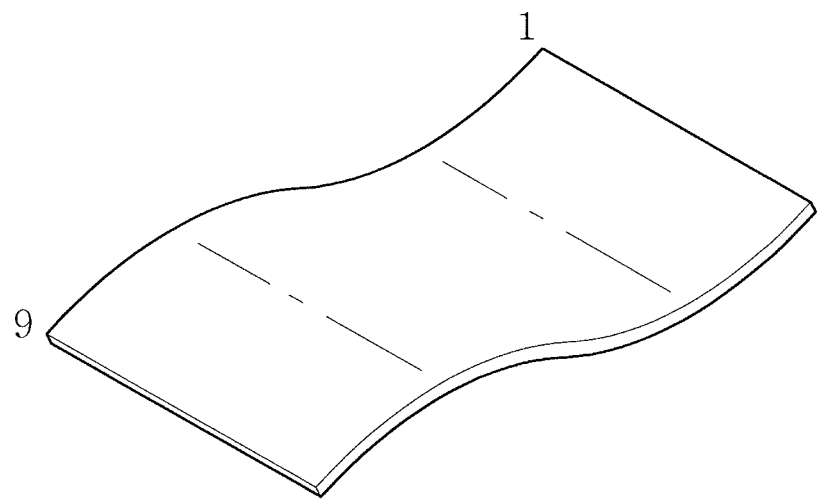
FIGS. 14A and 14B illustrate another example of a corrected haptic signal.
Figure 14B:
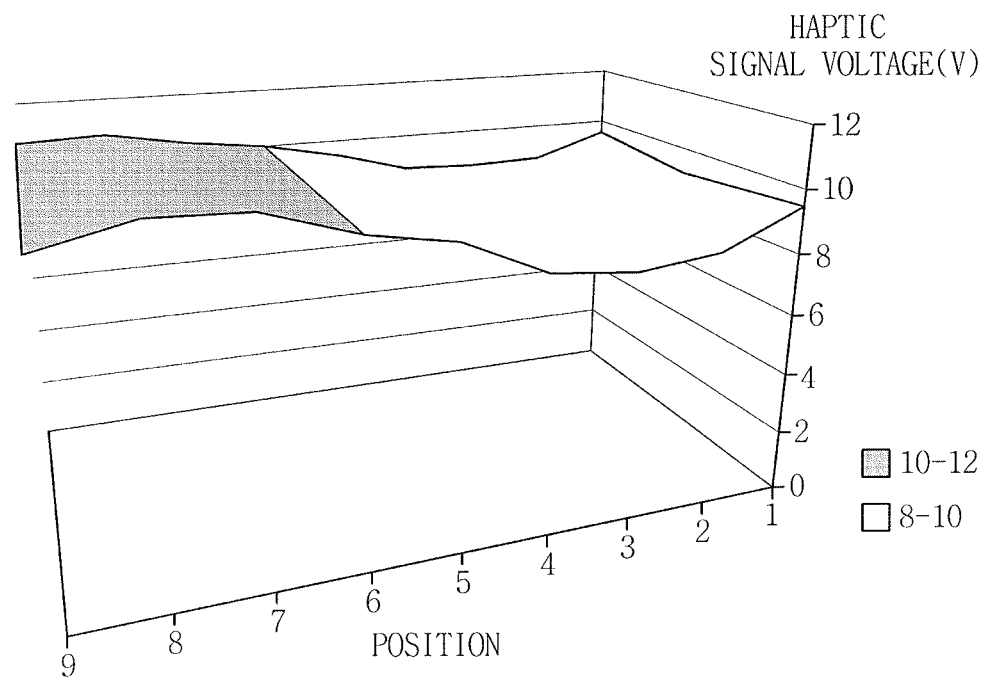

FIGS. 14A and 14B an example of a profile of a 2D curvature of another display panel and a corresponding corrected haptic signal. In FIG. 14A, the lower portion of the display device has a positive curvature and an upper portion has concave shape with a negative curvature. In FIG. 14B, the corrected haptic signal has a voltage level in the range of about 10V to about 11V applied to the lower portion of the display device and a voltage level in the range of about 9V to about 10V applied to the upper portion of the display device.

Figure 15A:
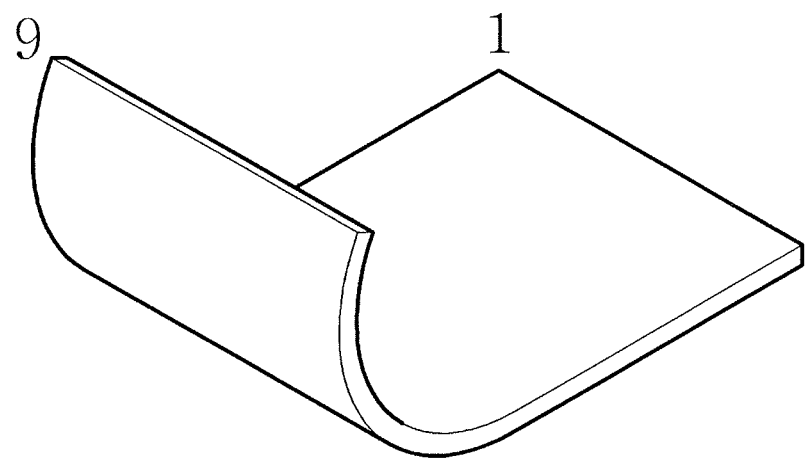
FIGS. 15A and 15B illustrate another example of a corrected haptic signal.
Figure 15B:
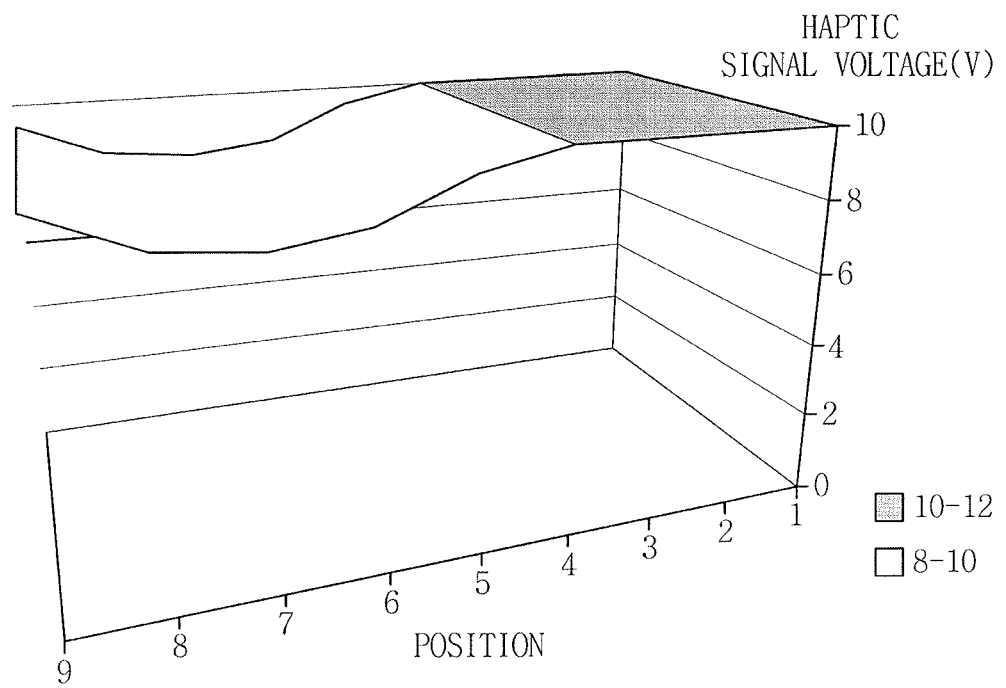

FIGS. 15A and 15B an example of a profile of a 2D curvature of another display panel and a corresponding corrected haptic signal. In FIG. 15A, the lower portion of a display device has a curved shape with a negative curvature and an upper portion has a planar shape with zero curvature. In FIG. 15B, the corrected haptic signal has a voltage level in the range of about 8V to about 10V applied to the lower portion of the display device. Since the upper portion of the display device has a zero curvature, the reference haptic signal voltage of 10V may be applied to the upper portion of the display device.

Curvature piezoelectric elements providing a haptic effect may be uniformly distributed in the display area of the display device. As the number of curvature piezoelectric elements constituting a curvature piezoelectric element array increases, a variable haptic effect based on curvature may be minutely controlled. On the other hand, with such an increase in the number of the curvature piezoelectric elements constituting the curvature piezoelectric element array, an output of a unit curvature piezoelectric element may decrease, and a driving unit such as a sensing part and a controller may be complicated. In the present exemplary embodiment, a variable haptic effect performed in conjunction with curvature may be provided using distributed curvature piezoelectric elements.

Figure 16A:
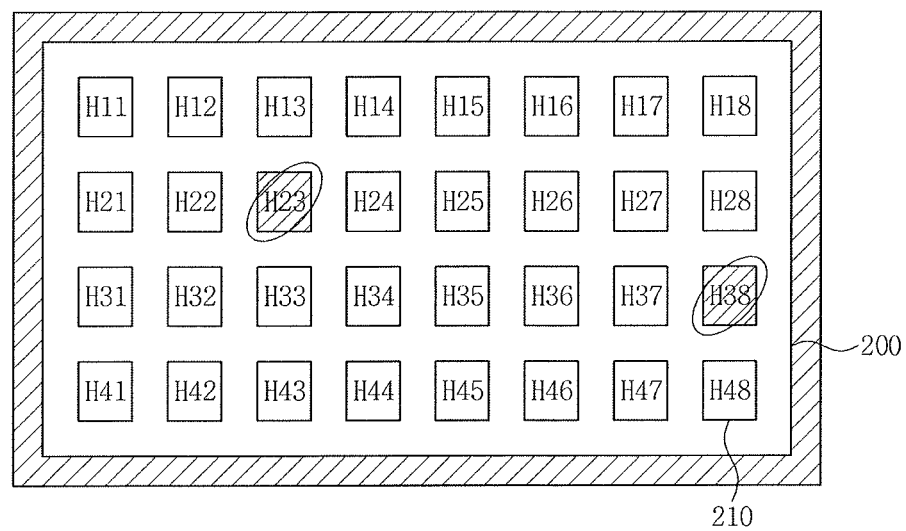
FIGS. 16A, 16B, and 16C illustrate embodiments of a multi-haptic control scheme of a piezoelectric element.
Figure 16B:
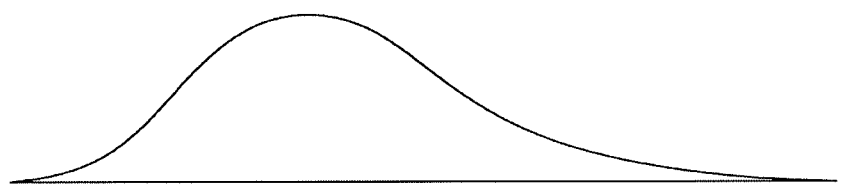
Figure 16C:
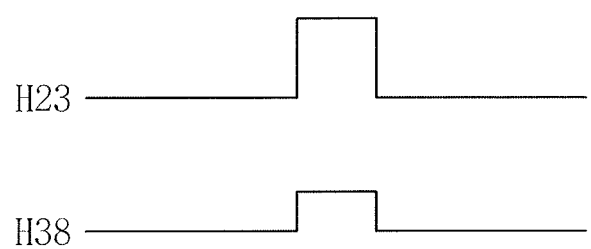

FIGS. 16A-16C illustrates an embodiment for performing multi-haptic control of curvature piezoelectric elements. FIG. 16A illustrates an embodiment of haptic panel 200 in which a touched position corresponds to a position of a curvature piezoelectric element. FIG. 16B is a graph illustrating curvature of the haptic panel 200. In this graph, a curved line with a positive curvature links curvature piezoelectric elements H13-H23-H33-H43.

FIG. 16C illustrates a waveform of a haptic signal applied to a haptic element at a touched position. When a position of a curvature piezoelectric element H38 is touched, the curvature piezoelectric element H38 receives a reference haptic signal. When a position of the curvature piezoelectric element H23 is touched, the curvature piezoelectric element H23 is determined to be a position having a positive curvature and receives a haptic signal corrected to have a higher level of a voltage than the reference haptic signal.

Figure 17A:
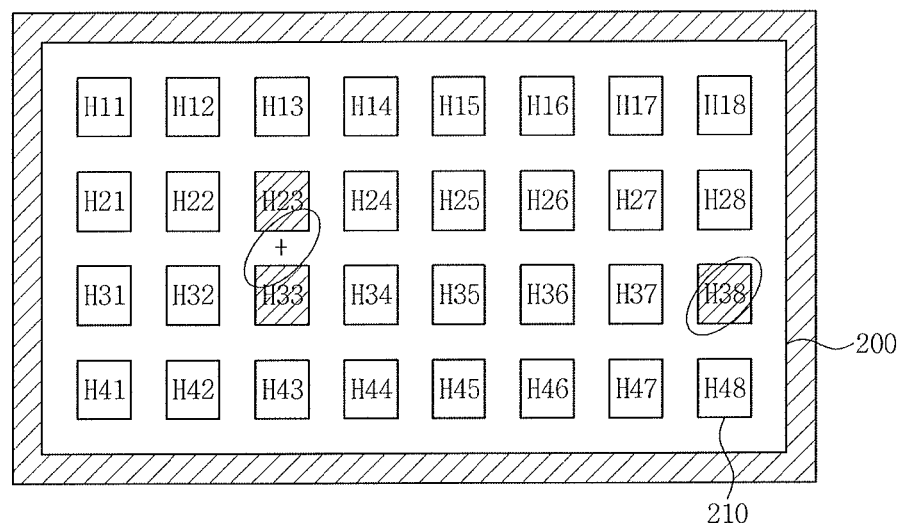
FIGS. 17A, 17B, and 17C illustrate other embodiments of a multi-haptic control scheme of a piezoelectric element.
Figure 17B:
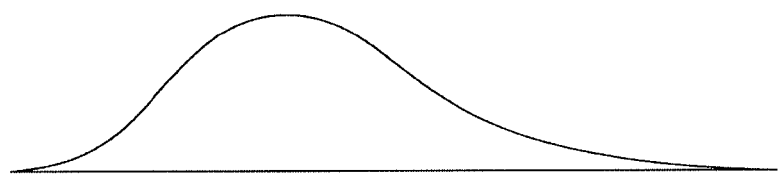
Figure 17C:
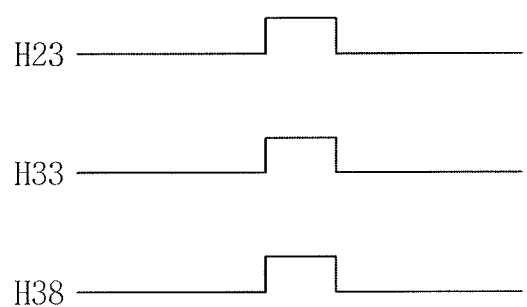

FIGS. 17A-17C illustrates another embodiment for performing multi-haptic control of curvature piezoelectric elements. FIG. 17A illustrates an embodiment of haptic panel 200 in which a touched position corresponds to a position of a curvature piezoelectric element and a position between curvature piezoelectric elements. The touched position may be a position of a curvature piezoelectric element H38 and a position between curvature piezoelectric elements H23 and H33. FIG. 17B illustrates a curve corresponding to the curvature of the haptic panel 200.

FIG. 17C illustrates a waveform of a haptic signal applied to a haptic element adjacent to the touched position. When the position of the curvature piezoelectric element H38 is touched, the curvature piezoelectric element H38 receives a reference haptic signal. The position between the curvature piezoelectric element H23 and the curvature piezoelectric element H33 may be touched.

In this embodiment, the display panel 100 may have a positive curvature. In this case, haptic driving unit 500 may designate the curvature piezoelectric elements H23 and H33 as an operating haptic element, and may apply a corrected haptic signal to each of the curvature piezoelectric elements H23 and H33. Since a haptic effect is induced by the plurality of curvature piezoelectric elements, for example, the curvature piezoelectric elements H23 and H33 herein, the haptic driving unit 500 may apply a haptic signal having a lower voltage level to the plurality of curvature piezoelectric elements than a voltage level of a haptic signal applied to a single curvature piezoelectric element.

The haptic driving unit 500 may vary correction values of the haptic signals based on a distance between the touched position and the operating curvature piezoelectric elements. In other words, when a touched position is closer to a predetermined curvature piezoelectric element than to other curvature piezoelectric elements, a haptic signal having a greater value may be applied to the predetermined curvature piezoelectric element which is closer to the touched position than that applied to the other curvature piezoelectric elements.

Figure 18A:
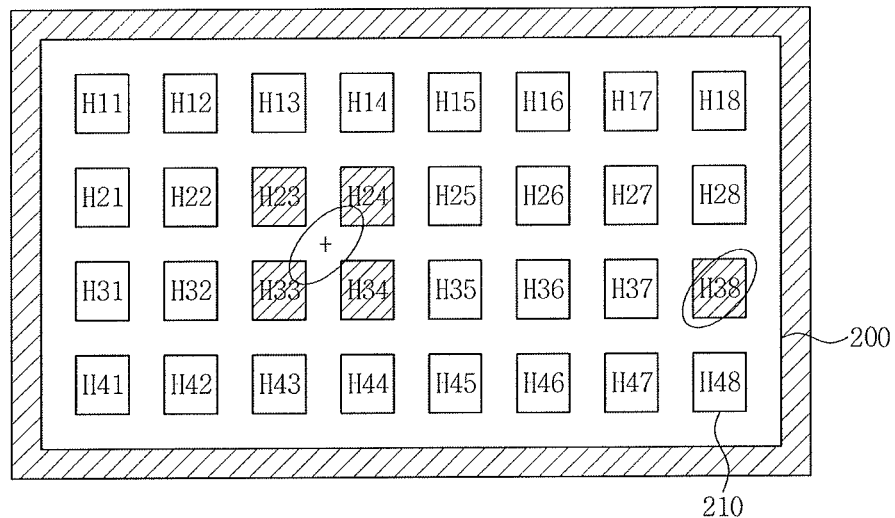
FIGS. 18A, 18B, and 18C illustrate other embodiments of a multi-haptic control scheme of a piezoelectric element.
Figure 18B:
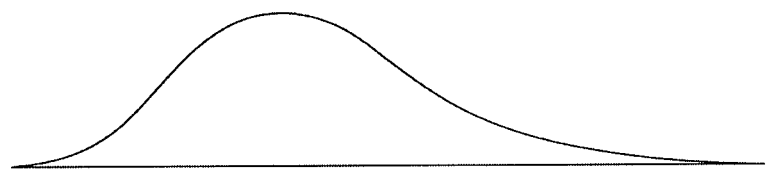
Figure 18C:
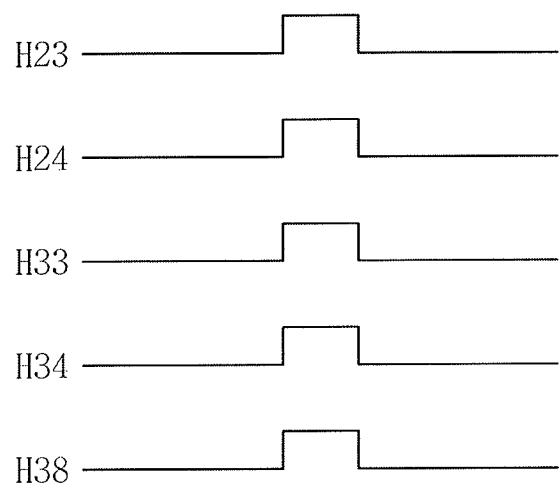

FIGS. 18A-18C illustrates another embodiment for performing multi-haptic control of curvature piezoelectric elements. FIG. 18A illustrates haptic panel 200 in a case in which a touched position is among four curvature piezoelectric elements, e.g., a quadrangular area formed by curvature piezoelectric elements H23, H33, H34, and H24 may be touched. FIG. 18B illustrates a curve corresponding to the curvature of the haptic panel 200. FIG. 18C illustrates a haptic signal applied to a haptic element adjacent to the touched position. In other words, FIG. 18C illustrates an example in which haptic signals are applied to four curvature piezoelectric elements. The haptic driving unit 500 may vary correction values of the haptic signals based on a distance between the touched position and operating curvature piezoelectric elements.

Figure 19:
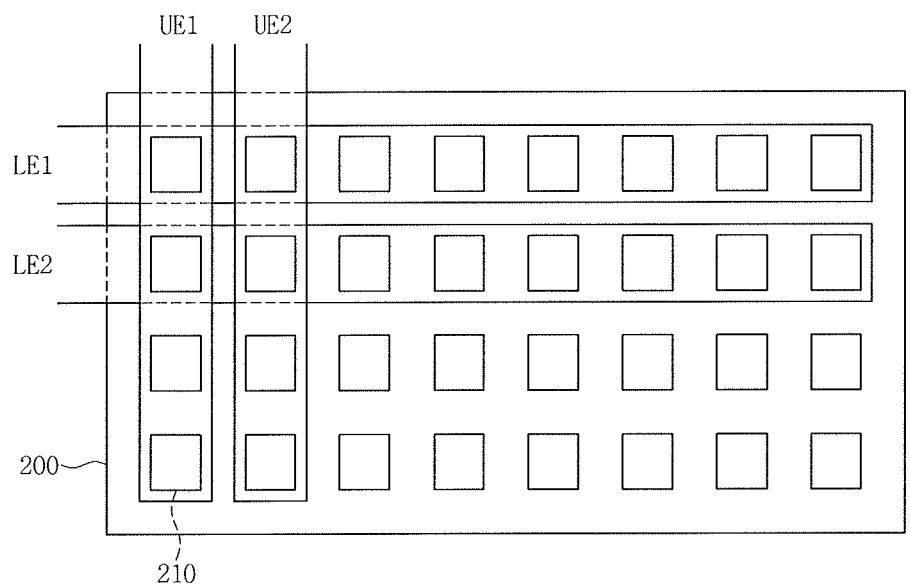
FIG. 19 illustrates an embodiment of haptic signal application wiring of a curvature piezoelectric element.

FIG. 19 illustrates an embodiment of a haptic signal application wiring of a curvature piezoelectric element. In this embodiment, the haptic panel 200 includes a plurality of haptic elements 210 electrically connected to a plurality of lower electrodes LE and to a plurality of upper electrodes UE. The lower electrode LE extend in a first direction D1 and the upper electrode UE extend in a second direction D2 intersecting the first direction D1. When reference voltages are sequentially applied to lower electrodes LE1 through LE4, upper electrodes UE1 through UE8 may simultaneously output a curvature detection signal or may receive a haptic signal applied thereto.

Figure 20:
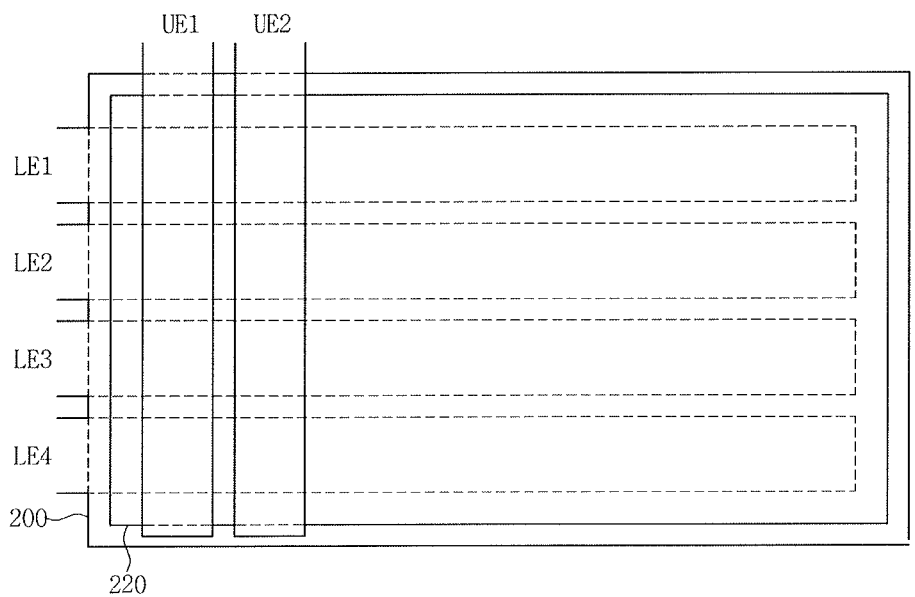
FIG. 20 illustrates an embodiment of a haptic panel including a planar piezoelectric layer.

FIG. 20 illustrates an embodiment of haptic panel 200 including a planar piezoelectric layer 220. Referring to FIG. 20, a lower electrode LE and an upper electrode UE are arranged in a row and column matrix, respectively, while intersecting one another. The planar piezoelectric layer 220 is positioned between the upper electrode UE and the lower electrode LE. The planar piezoelectric layer 220 may be coated over an entire surface of the haptic panel 200. A piezoelectric element including the lower electrode LE, the piezoelectric layer 220, and the upper electrode UE may be arranged in a matrix form.

When the piezoelectric layer 220 is coated over the entire surface of the haptic panel 200, the manufacturing process may be simplified. When a width of the lower electrode LE and the upper electrode UE is adjusted, changing the size of the piezoelectric element may be convenient.

Figure 21:
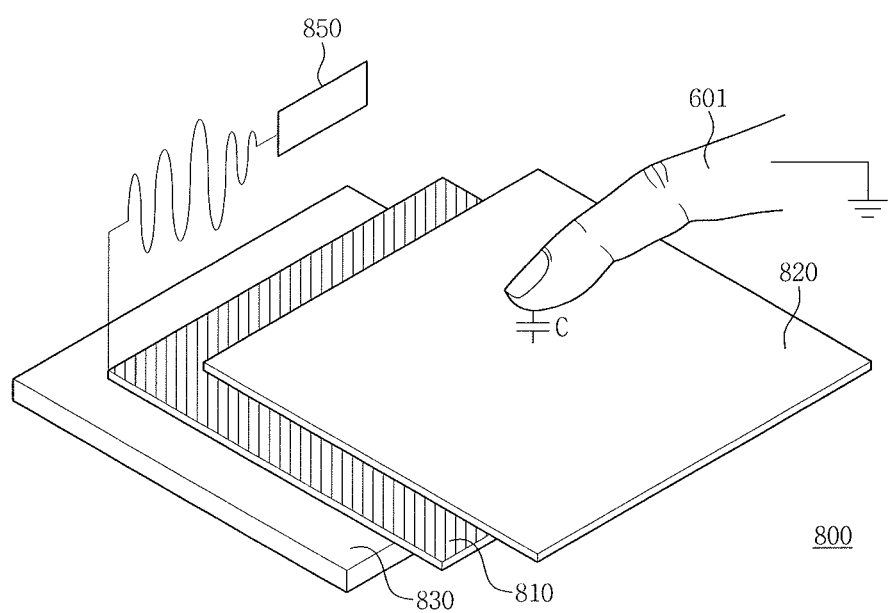
FIG. 21 illustrates an embodiment of a haptic panel using an electrostatic attraction scheme.

FIG. 21 illustrating an embodiment of a haptic panel 800 using an electrostatic attraction scheme. The haptic panel 800 is a capacitive haptic panel which provides a haptic effect using a electrostatic attraction scheme. The capacitive haptic panel 800 includes a conductive layer 810 and an insulating layer 820. The conductive layer 810 may include a conductive electrode formed, for example, of copper (Cu), aluminum (Al), gold (Au), silver (Ag), or the like, or a transparent conductive material such as a metal oxide. The insulating layer 820 insulates the conductive layer 810, may include glass, plastic, or a polymer, and may have flexibility.

A haptic driving unit 850 applies an alternating current (AC) electric signal to the conductive layer 810. A capacitive coupling C may be generated by the insulating layer 820 between a finger 601 of a user and the conductive layer 810 to which the AC electric signal is applied. Due to the capacitive coupling C, a minute tensile stress may be generated on the finger 601 and a variation on a surface of the finger 601 may be induced. The user may recognize the variation on the surface of the finger 601 as a tactile sensation. A type of the tactile sensation sensed by the user may vary based on a frequency of a signal applied from the haptic driving unit 850 to the capacitive haptic panel 800.

The capacitive haptic panel 800 operates using the conductive layer 810 and the insulating layer 820, and these layers may be formed on the entire surface of the capacitive haptic panel 800. A curvature detection sensor may detect curvature, and may increase and/or decrease a level of an operating voltage of the overall capacitive haptic panel 800 in conjunction with the curvature at a touched position.

The capacitive haptic panel 800 may further include a curvature measurement sensor for measuring a curvature. The curvature measurement sensor may include, for example, a piezoelectric element array, a microelectromechanical systems pressure sensor, a strain gauge, a capacitive pressure sensor, or the like. The capacitive haptic panel 800 based on the electrostatic attraction scheme may be on a front surface of the display panel 100, and the curvature measurement sensor may be on a rear surface of the display panel 100.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The signal processor and other control features of the embodiments disclosed herein may be implemented in logic which, for example, may include hardware, software, or both. When implemented at least partially in hardware, the signal processor and other control features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the signal processor and other control features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

As set forth above, according to one or more exemplary embodiments, the haptic panel may provide a predetermined haptic feedback, irrespective of a direction or a degree of a curvature of the display panel of the flexible display device.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A flexible display device, comprising:
   a flexible display panel;
   a touch panel to detect a touch input;
   a haptic panel to produce a tactile sensation;
   a haptic driver to control the haptic panel; and
   a curvature detector to detect a curvature of the display panel, wherein the haptic driver is to control a haptic signal corresponding to curvature information output of the curvature detector and a position of the touch input on a screen of the flexible display panel, the curvature information indicating a positive curvature or a negative curvature of the display panel, the haptic signal to generate a different haptic effect depending on whether the curvature information indicates the positive curvature or the negative curvature for the touch input.

2. The device as claimed in claim 1, wherein the haptic driver is to increase the haptic signal as an absolute value of the curvature of the display panel increases.

3. The device as claimed in claim 1, wherein the haptic driver is to increase the haptic signal as an absolute value of the curvature of the display panel increases and when the position of the touch input on the display panel has the positive curvature.

4. The device as claimed in claim 1, wherein the haptic driver is to decrease the haptic signal as an absolute value of the curvature of the display panel increases and when the position of the touch input on the display panel has the negative curvature.

5. The device as claimed in claim 1, wherein the haptic driver includes a plurality of piezoelectric elements to generate vibration.

6. The device as claimed in claim 5, wherein the piezoelectric elements are arranged in an array having a matrix form that corresponds to a screen area of the display panel.

7. The device as claimed in claim 6, wherein the piezoelectric elements in the array are to be controlled based on a same haptic signal.

8. The device as claimed in claim 6, wherein the piezoelectric element array is substantially on an entire surface of the display panel.

9. The device as claimed in claim 8, further comprising:
   a transparent electrode to connect the haptic driver to the piezoelectric element array.

10. The device as claimed in claim 5, wherein each piezoelectric element is to detect curvature.

11. The device as claimed in claim 1, wherein the haptic panel includes an electrostatic haptic element to generate capacitive coupling based on an electric signal.

12. The device as claimed in claim 11, wherein the haptic panel includes a curvature sensor.

13. A flexible display device, comprising:
    a flexible display panel;
    a touch panel to detect a touch input;
    a haptic panel including at least one piezoelectric element to generate vibration; and
    a haptic driver to supply a haptic signal to the haptic panel, wherein the haptic panel is to detect a negative curvature or a positive curvature of the display panel using the at least one piezoelectric element and to output curvature information indicative of the negative curvature or the positive curvature, and wherein the haptic signal is to generate a different haptic effect depending on whether the curvature information indicates the positive curvature or the negative curvature based on a position of the touch input.

14. The device as claimed in claim 13, wherein the haptic driver includes:
    a curvature detector to detect curvature of the display panel, and
    a haptic signal supplier to apply a voltage to the at least one piezoelectric element.

15. The device as claimed in claim 14, wherein the haptic driver includes a memory to store curvature information of the display panel.

16. The device as claimed in claim 14, wherein the haptic driver is to apply the haptic signal to the at least one piezoelectric element, and wherein the at least one piezoelectric element is adjacent to a position of the touch input detected by the touch panel.

17. The device as claimed in claim 16, wherein the haptic driver is to vary a value of the haptic signal based on a change in curvature of the display panel.

18. The device as claimed in claim 16, wherein the haptic driver is to vary a duration of time to apply the haptic signal based on a change in curvature of the display panel.

19. The device as claimed in claim 16, further comprising:
    a plurality of piezoelectric elements,
    wherein the haptic driver is to apply haptic signals to ones of the piezoelectric elements that are adjacent to the position of the touch input.

* * * * *